United States Patent
Winkler (10) Patent No.: US 8,397,626 B2
(45) Date of Patent: Mar. 19, 2013

(54) HEIGHT ADJUSTABLE BEVERAGE BREWER

(76) Inventor: Bernard Winkler, Land O Lakes, FL (US)

( * ) Notice: Subject to any disclaimer, the term of this patent is extended or adjusted under 35 U.S.C. 154(b) by 539 days.

(21) Appl. No.: 12/697,041

(22) Filed: Jan. 29, 2010

(65) Prior Publication Data

US 2011/0185906 A1    Aug. 4, 2011

(51) Int. Cl.
  *A47J 31/00*   (2006.01)
(52) U.S. Cl. ............... 99/284; 99/279; 99/304; 99/306
(58) Field of Classification Search ............ 99/284, 99/304, 306, 279, 290; 141/279, 266, 270, 141/284, 376; 211/207; 248/404, 125.8; 108/147.19; 312/223.1, 312
See application file for complete search history.

(56) References Cited

U.S. PATENT DOCUMENTS

| | | | |
|---|---|---|---|
| 2,245,389 A | 6/1941 | Cremer | |
| 3,932,009 A * | 1/1976 | Zollinger | 312/312 |
| 4,054,085 A | 10/1977 | Tarr | |
| 4,638,928 A | 1/1987 | Webster | |
| D288,057 S | 2/1987 | Webster | |
| 4,829,888 A | 5/1989 | Webster et al. | |
| 4,892,031 A | 1/1990 | Webster et al. | |
| 5,145,009 A * | 9/1992 | Mheidle et al. | 141/83 |
| 5,285,718 A | 2/1994 | Webster et al. | |
| D348,373 S | 7/1994 | Webster | |
| 5,408,940 A | 4/1995 | Winchell | |
| 5,916,351 A | 6/1999 | Sintchak | |
| 6,082,246 A | 7/2000 | Thorn et al. | |
| 6,181,104 B1 | 1/2001 | Rhoads | |
| 6,474,221 B2 | 11/2002 | Shaanan et al. | |
| 6,481,339 B1 | 11/2002 | Castleberry | |
| 6,766,729 B2 | 7/2004 | Rolland | |
| 6,817,280 B2 | 11/2004 | Hall et al. | |
| 6,971,304 B1 | 12/2005 | Lin | |
| D523,691 S | 6/2006 | Greenwood, III et al. | |
| 7,128,230 B2 | 10/2006 | Jacobson et al. | |
| 7,167,419 B2 | 1/2007 | Kwan et al. | |
| D557,971 S | 12/2007 | Webster et al. | |
| 7,353,850 B2 * | 4/2008 | Greiwe et al. | 141/279 |
| D584,098 S | 1/2009 | Webster et al. | |
| D585,230 S | 1/2009 | Webster | |
| 7,478,584 B2 * | 1/2009 | Turi | 99/284 |
| 8,162,558 B2 * | 4/2012 | Warner | 403/109.1 |
| 2006/0090653 A1 | 5/2006 | McDuffie et al. | |

(Continued)

OTHER PUBLICATIONS

Product brochure, Newco Enterprises, "20 to 1 Brewer," two sheets (admitted prior art).

(Continued)

*Primary Examiner* — Reginald L Alexander
(74) *Attorney, Agent, or Firm* — Lempia Summerfield Katz LLC (57) ABSTRACT

A beverage brewer assembly has a base configured to rest on a surface, an upward facing vessel support, and a tower coupled to and extending up from the base. The tower has a stationary lower section and an upper section vertically height adjustable relative to the lower section. A head is coupled to the upper section of the tower and has a cantilevered section extending forward from the tower and spaced above the vessel support. A height adjust mechanism includes a vertically oriented male threaded shaft interconnecting the upper and lower sections of the tower. Relative rotation between the male threaded shaft and a female threaded element carried on a part of the tower selectively raises and lowers the vertical position of the upper section and head relative to the lower section and base.

18 Claims, 8 Drawing Sheets

U.S. PATENT DOCUMENTS

| | | |
|---|---|---|
| 2006/0283330 A1 | 12/2006 | Lin |
| 2007/0295220 A1 | 12/2007 | Webster et al. |
| 2008/0028944 A1 | 2/2008 | Webster et al. |
| 2008/0282897 A1 | 11/2008 | Webster et al. |
| 2009/0101020 A1 | 4/2009 | Webster et al. |

OTHER PUBLICATIONS

Operation and service manual, "Newco 20 to 1 Brewer," ten sheets (admitted prior art).

* cited by examiner

HEIGHT ADJUSTABLE BEVERAGE BREWER

BACKGROUND

1. Field of the Disclosure

The present invention is generally related to beverage brewing machines, and more particularly to a brewer that is height adjustable.

2. Description of Related Art

Beverage brewing machines are known in the art for both commercial use as well as consumer, in-home use. A beverage brewer is typically utilized to brew a fresh beverage from a brewing substance, such as coffee grounds, tea leaves, or the like. Beverage brewing machines come in many different configurations and can vary from highly complex commercial brewers configured for heavy or continuous use to much simpler, in-home brewers for occasional use. These types of brewing machines are thus used in a wide range of environments. As a result, a wide variety of usage parameters, counter space variations, site characteristics, and the like are often considered when designing or selecting a particular beverage brewing machine.

One additional variable is often encountered during use of a brewing machine. A brewed beverage is dispensed from the brewer into a container or vessel. The type of vessel into which the brewed beverage is delivered can vary widely. The size, shape, volume, height, top or fill-opening size, and the like of the vessels can vary greatly. Many beverage brewing machines are configured to accommodate a single vessel size and, thus, may not be compatible with other types of vessels. A vessel may be too large to be placed beneath the dispenser of the machine for dispensing liquid into the vessel. Alternatively, the vessel might be too small for a larger size machine such that the dispensed beverage travels a long distance before reaching the vessel. This can cause the beverage to splash from the vessel or even to cool while being dispensed into the vessel.

A number of height adjustable coffee brewing machines are known in the art. For example, U.S. Pat. Nos. 4,054,085 and 5,916,351 disclose brewing machines that are modular in nature. Each of the disclosed machines has a housing or tower that can be extended by the addition of an adapter or extension insert to increase the height of the tower and, thus, to accommodate a range of vessel heights. U.S. Pat. No. 6,082,246 and Publication No. 2006/0283330 each disclose coffee makers that are also height adjustable. Each of these disclosed brewing machines has a housing or tower that can be extended in height by operation of a motorized rack and pinion gear system that raises and lowers one portion of the tower relative to another. Thus, these disclosed brewing machines also can accommodate different height vessels.

The motor and gear systems include a number of parts that are relatively complex and expensive and that can fail during use. The insert or adapter systems require providing an additional, separate housing piece, which must be stored when not being used.

SUMMARY

A beverage brewing machine is disclosed herein in one example that has a base configured to rest on a surface, an upward facing vessel support; and a tower coupled to and extending up from the base. The tower can have a stationary lower section and an upper section vertically height adjustable relative to the lower section. A head can be coupled to the upper section of the tower. The head can have a cantilevered section extending forward from the tower and spaced above the vessel support. A height adjust mechanism can include a vertically oriented male threaded shaft interconnecting the upper and lower sections of the tower. Relative rotation between the male threaded shaft and a female threaded element carried on a part of the tower can selectively raise and lower the vertical position of the upper section and head relative to the lower section and base.

A beverage brewing machine in one example can have a male threaded shaft that can rise and fall vertically in concert with the upper section as the height of the tower is adjusted.

A beverage brewing machine in one example can have a male threaded shaft that can remain vertically fixed while the upper section moves as the height of the tower is adjusted.

A beverage brewing machine can have a male threaded shaft that rotates and can have a female threaded element that can remain rotationally fixed as the height of the tower is adjusted.

A beverage brewing machine can have a height adjust mechanism with a vertically oriented guide rod that can also interconnect the upper and lower sections of the tower. A beverage brewing machine can have a pair of the guide rods positioned adjacent and flanking a male threaded shaft.

A beverage brewing machine can have a female threaded element that is a nut affixed to a portion of one of the upper or lower sections of the tower.

A beverage brewing machine can have a threaded nut that can be affixed to a plate that can in turn be affixed within an interior of the tower to one of the upper section or the lower section.

A beverage brewing machine can have a height adjust mechanism that can include a lower fixed plate connected to the lower section or the base.

A beverage brewing machine can have a female threaded element that can be affixed to a lower fixed plate that can be connected near a top end of the lower section. A male threaded shaft can be connected to the upper section for vertical movement therewith.

A beverage brewing machine can have a male threaded shaft that can be affixed to an upper plate that can be vertically aligned with a lower fixed plate and that can be connected near a top end of the upper section.

A beverage brewing machine can have a female threaded element that can be affixed to an upper plate connected near a bottom end of the upper section and that can be movable therewith. A male threaded shaft can be connected to the lower section or the base.

A beverage brewing machine can have a male threaded shaft that can be affixed to a lower fixed plate vertically aligned with the upper plate and connected near a bottom end of the lower section.

A beverage brewing machine can have a height adjust mechanism that can be disposed within an interior of the tower.

A beverage brewing machine can have a height adjust mechanism that can include a lower plate fixed to the base or the lower section, an upper plate fixed to the upper section for movement therewith, and a guide rod passing slidably through one of the lower or upper plates as the height of the tower is adjusted.

A beverage brewing machine can include a guide rod that can be affixed to a lower plate and a male threaded shaft that can be connected to the lower plate, each being vertically stationary as the height of the tower is adjusted. A female threaded element can be carried on the upper plate.

A beverage brewing machine can have a guide rod that can be affixed to the upper plate and a male threaded shaft that can be connected to the upper plate, each moving vertically in concert with movement of the upper section. A female threaded element can be carried on the lower plate.

A beverage brewing machine can include a pair of guide rods positioned adjacent and flanking a male threaded shaft.

A beverage brewing machine can have a vessel support that can be provided on an upward facing surface of the base beneath the cantilevered section of the head.

A beverage brewing machine can have the lower section of the tower affixed to the base.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed beverage brewing machines solve or improve upon one or more of the above-noted and/or other problems and disadvantages with prior known brewing machines. In one example, the disclosed beverage brewing machines includes a manual height adjust mechanism that incorporates a threaded shaft. The threaded shaft in one example is oriented vertically and extends between two sections of the housing or tower on the brewer. In one example, an upper section can move vertically relative to the lower section when the threaded shaft is rotated. In one example, the threaded shaft is vertically stationary and can rotate. Rotation of the shaft drives a nut or threaded element up or down along the shaft to raise or lower the upper section relative to the lower section of the housing or tower. In another example, the threaded shaft, when rotated, travels vertically along with movement of the upper section. In such an example, a threaded nut or female threaded element is fixed to a portion of the lower section of the housing or tower. Use of a simple mechanical height adjust mechanism as disclosed herein can significantly reduce the occurrence of a mechanical or an electrical breakdown of a rack and pinion gear system or electric motor as used with some prior art height adjustable brewers. In addition, use of the disclosed simple manual height adjust mechanism eliminates the need for a separate adaptor or insert component that must be stowed or stored when not being utilized on a prior art brewer.

Figure 1:
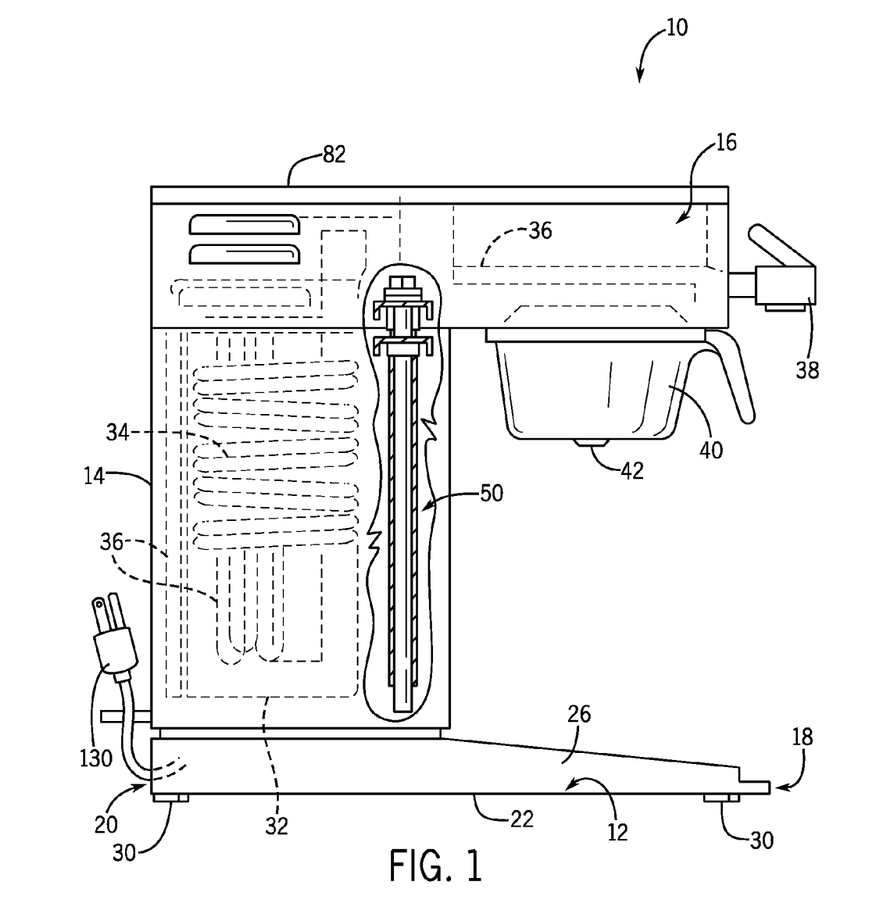
FIG. 1 shows a partial cut-away view of one example of a beverage brewing machine constructed in accordance with the teachings of the present invention.
Figure 2:
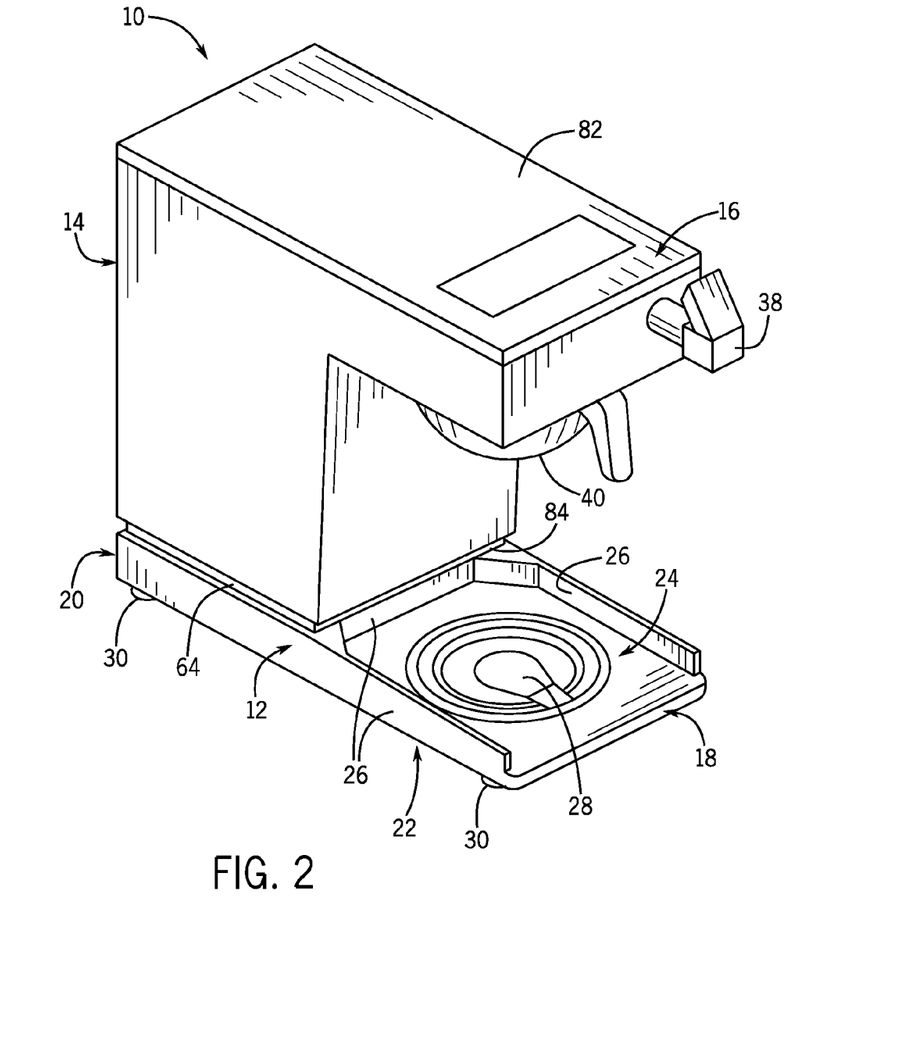
FIG. 2 shows a front and top perspective view of the beverage brewing machine shown in FIG. 1.

Turning now to the drawings, FIGS. 1 and 2 illustrate one example of a beverage brewing machine in the form of a coffee brewer assembly 10 constructed in accordance with the teachings of the present invention. The height adjustable machine 10 disclosed herein can be utilized on various types of brewers other than coffee brewers. For example, the height adjust concept can be employed on a tea brewer or other beverage brewing machine. However, the embodiments of the invention are described with reference to a coffee brewer.

In general, the disclosed brewing machine 10 has a base 12, a tower 14, and a head 16. In this example, the base 12 is an elongate rectangular structure with a forward end 18, rear end 20, a bottom 22, and a top side. The upward facing or top side of the base 12 adjacent the forward end 18 forms a vessel support 24. The vessel support 24 can be configured to support thereon a container or vessel for receiving a brewed beverage. As is known in the art, the vessel support 24 can include a surrounding wall 26 and a vessel pad or ring 28 that faces upward on the top side of the base 12. The wall 26 can assist in retaining a vessel seated on the pad 28 and inhibiting the vessel from being knocked off the pad. The pad 28 can be configured to retain drips or splashes that miss the vessel and can incorporate a heating plate or element to assist in keeping brewed beverage warm once stored in the vessel, or the like. The configuration and construction of the base, vessel support wall, and vessel pad can vary within the spirit and scope of the present invention.

The bottom side of the base 12 can include a plurality of feet 30, which can also be height adjustable, to help level the brewing machine 10 when placed on a support surface and to help grip the support surface if desired. The tower 14 or housing assembly of the brewing machine in this example is connected to the base near the rear end 18 and behind the vessel support 24. In this example, the tower or housing assembly 14 contains the majority of the working components of the brewing machine 10.

As is known in the art, the brewing machine 10 can incorporate any number of components. For example, a reservoir or tank 32 can be configured to store a volume of liquid, such as water, used for the brewing process. The tank 32 can be stored within the tower 14. The components can also include a heating element or coil 34 associated with the tank 32 to heat the liquid within the tank prior to delivery of the fluid to the brewing material. Though not shown herein, the brewing machine can also incorporate a plurality of electronic components and valves that can be utilized to operate and control the various brewing cycles of the assembly. Conduit 36 can be routed throughout the tower or housing assembly 14 and the head 16. The conduit can deliver the brewing liquid to the tank 32 and can dispense same from the tank after the liquid is heated. As in known in the art, the brewing machine 10 can include a separate hot water tap 38, which is routed to bypass the brewing material so as to provide a source of clean hot water, if and when needed. The present invention is not intended to be limited to any type of brewing components, controls, systems, or the like. These components can vary considerably within the spirit and scope of the present invention and are thus not described in any further detail herein.

The head 16 of the brewing machine 10 is coupled to the upper end of the tower assembly 14. A portion of the head is a cantilevered section 39 that extends forward beyond the tower assembly. The cantilevered section 39 overhangs the vessel support and is spaced above the vessel support. The vertical gap between the head and the support 24 creates a vessel space. A container or vessel can be placed into the space or gap to receive brewed beverage dispensed from the machine 10. As is known in the art, a coffee brewer typically includes a brewer basket or brewing material receptacle 40. In this example, the brewer basket 40 is connected to the head 16 on the underside of the cantilevered section 39 above the vessel support 24. As is known in the art, the brewer basket 40 is configured to retain a filter media, if needed, and a quantity of brewing material such as coffee grounds, tea leaves, or the like. Though not shown herein, a portion of the conduit 36 is routed within the head through the cantilevered section 39 so as to spray or deliver heated liquid to the brewing material within the basket 40. The basket 40 is typically configured as a funnel-like or cup-like structure with a dispensing orifice 42 positioned through its bottom near the center. The dispensing orifice 42 is typically positioned directly over the vessel pad 28 so that brewed beverage dripped from the orifice 42 in the basket 40 is delivered directly into a fill-opening of the vessel or container.

Figure 3:
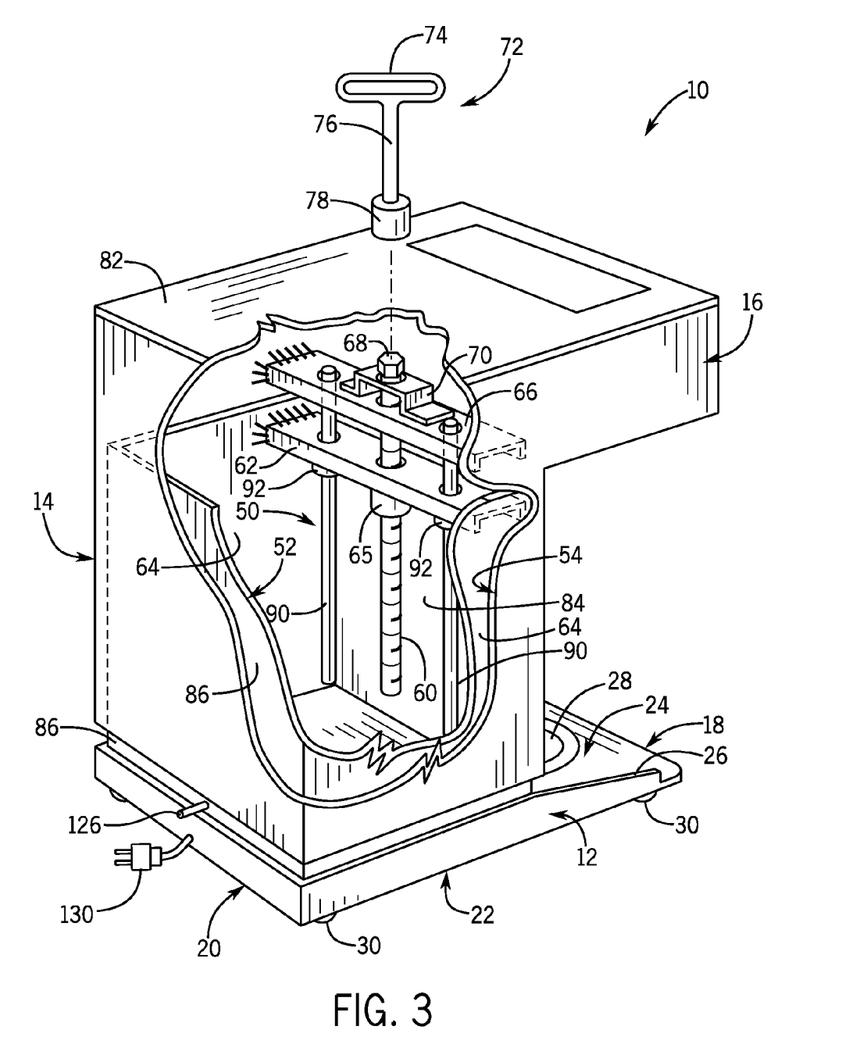
FIG. 3 shows a rear perspective and partial cut-away view of the beverage brewing machine shown in FIG. 1, the brewer being in a minimum adjusted height configuration.

As shown in FIGS. 1 and 3, the brewing machine 10 in this example also has a height adjustment mechanism 50 associated with the tower 14. In general, the height adjustment mechanism 50 is utilized to raise or lower the height of the tower 14 and, thus, the head 16. With reference to FIG. 3, the tower 14 in this example is a generally vertically oriented square tube with a hollow interior and two sections. The tower 14 has a lower section 52 and an upper section 54. In this example, the lower section 52 is affixed to the upper side of the base 12 near the rear end 20. The upper section 54 is sized to slidably seat over the exterior of the lower section 52 and thus form a telescoping structure.

As will be evident to those having ordinary skill in the art upon reading this disclosure, the structure of the tower or housing 14 can vary within the spirit and scope of the present invention. The shape of the tower sections 52 and 54 can vary from the rectangular configuration disclosed herein and instead be circular, oval, rectangular, or the like. In addition, the upper section 54 can be configured to the slide and telescope within the interior of the lower section 52, if desired.

In general, the height adjustment mechanism 50 is utilized to raise or lower the upper section 54 relative to the lower section 52. By doing so, the gap between the head 16, and in particular the basket 40, and the vessel support 24 can be altered to accommodate various beverage containers or vessels of different height. In one example, the height adjustment mechanism 50 employs a manual screw thread device with a male threaded shaft 60. The shaft 60 is positioned within the tower 14 in this example. In general, the male threaded shaft 60 interconnects the upper and lower sections 52 and 54 of the tower 14. As shown in FIG. 3, the mechanism 50 has a fixed plate 62 affixed to and extending between side walls 64 of the lower section 52. In this example, the fixed plate 62 is carried near the upper end of the lower section 52. In an alternate embodiment, the fixed plate 62 can be an inwardly bent top edge of one of the walls of the lower section 52 instead of being a separate plate secured to the side walls 64.

In this example, the male threaded shaft 60 extends through an opening or hole in the fixed lower plate 62 and engages a female threaded nut 65 or element carried on the fixed plate. The height adjust mechanism 50 in this example also employs an upper plate 66 carried by the upper section 54 of the tower 14. The upper plate 66 moves in unison or in concert with the upper section 54. An upper end of the male threaded shaft 60 has a hex head 68 thereon. The upper end of the shaft 60 extends through an opening or hole in the upper plate 66. In this example, the upper plate 66 also includes a standoff 70 that projects upward from a top side of the upper plate 66. A small diameter groove (not shown) on the shaft 60 below the hex head 68 seats in an opening through the standoff 70 to capture the threaded shaft therein. Thus, the threaded shaft 60 can rotate relative to the upper plate 66 and the standoff 70, but is affixed axially to the upper plate and standoff via the groove.

Figures 4, 6:
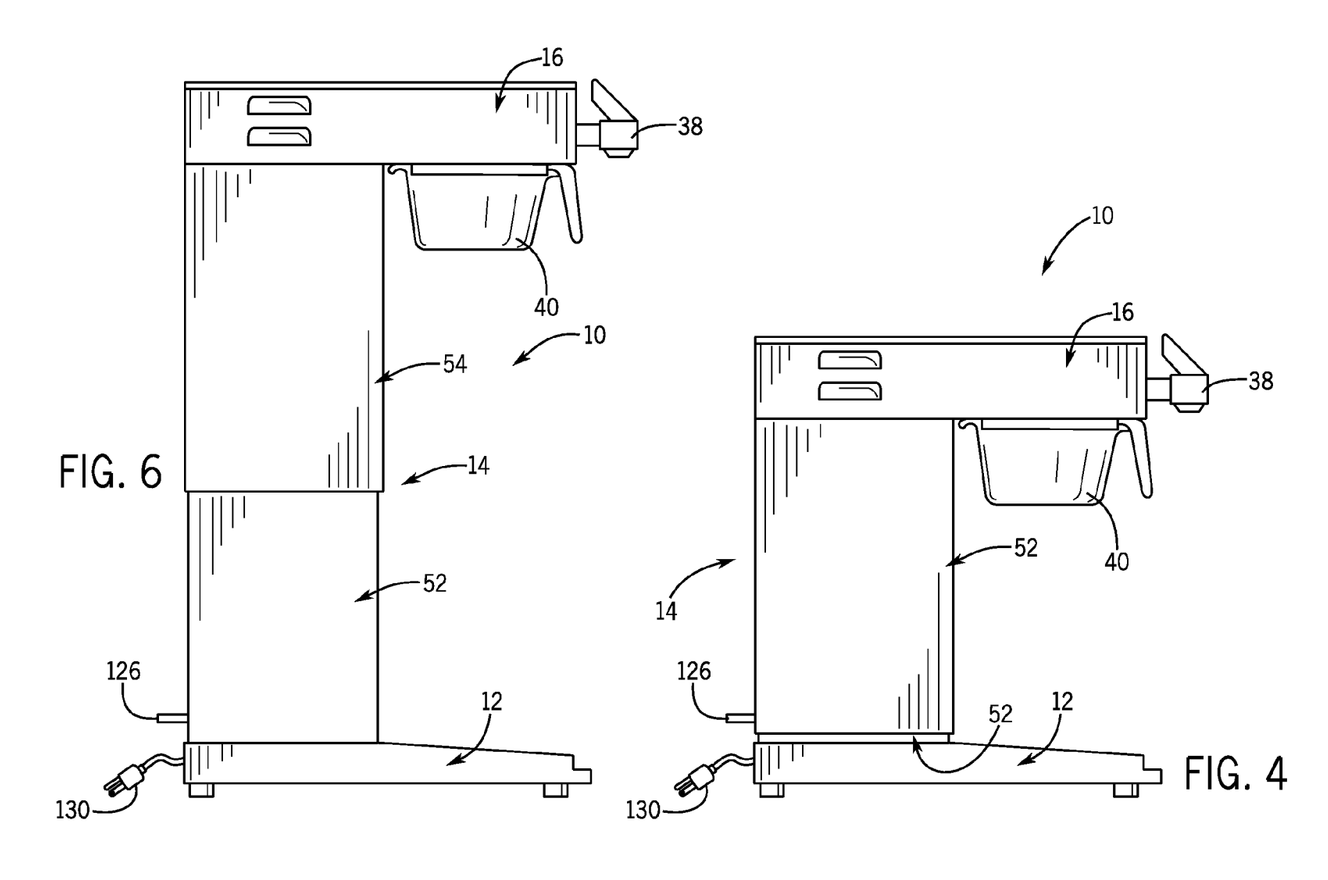
FIG. 4 shows a side view of the beverage brewing machine depicted in FIG. 3.
FIG. 6 shows a side view of the beverage brewing machine shown in FIG. 5.

A turnkey or tool 72 has a handle 74 at one end of a stem 76 and a socket 78 connected to the other end of the stem. The turnkey 72 can be utilized to rotate the hex head 68 and, thus, the male threaded shaft 60 in either direction as represented by the arrows in FIG. 3. Rotating the shaft 60 in one direction will drive the upper plate 66 upward and away from the fixed lower plate 62 by engagement of the male threads with the female nut 64. Rotation of the shaft in the reverse direction will lower the upper plate 66 downward relative to the fixed lower plate 62. In doing so, the upper section 54 of the tower will rise or fall relative to the lower section 52. FIGS. 3 and 4 are representative of the brewing machine 10 in a lower most or minimum adjusted height configuration. In this configuration, a substantial majority of the male threaded shaft 60 protrudes downward through and below the lower fixed plate 62. Also, the upper section 54 of the tower 14 nearly or entirely encompasses the lower section 52. The height of the brewing machine 10, or the vessel space or gap, in this minimum height configuration can be nearly or entirely defined by the height of only one of the tower sections 52 or 54.

Figure 5:
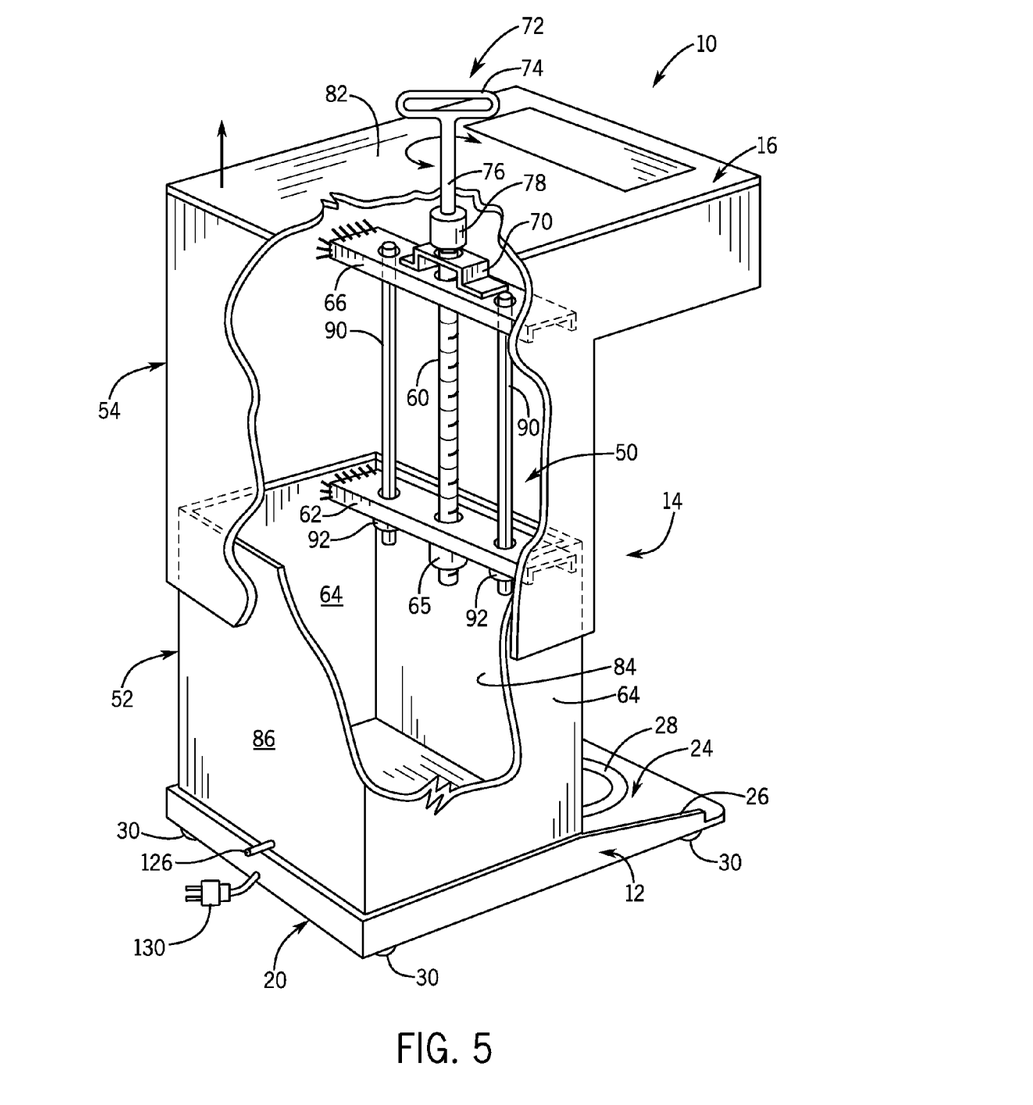
FIG. 5 shows a rear perspective and partial fragmentary view of the beverage brewing machine shown in FIG. 1, but in a maximum adjusted height configuration.

As shown in FIGS. 5 and 6, the male threaded shaft 60 can be turned in order to raise the upper section 54 of the tower 14 to an upper most or maximum adjusted height configuration. In this configuration, a substantial majority of the male threaded shaft 60 protrudes upward through and above the lower fixed plate 62. Also, the lower section 52 is almost entirely exposed below the upper section 54. The height of the brewing machine 10, or the vessel space or gap, in this maximum height configuration can be nearly or entirely defined by the combined height of both tower sections 52 and 54.

The brewing machine 10 can be configured to employ one or more positional stops to limit the downward and/or upward travel of the upper section 54 relative to the lower section 52 on the tower. Such stops can vary in configuration and construction. In one example, downward travel of the upper section can be limited by contact between the upper plate 66 and the fixed lower plate 62. In another example, downward travel of the upper section 54 can be limited by the upper section walls, including side walls 79 bottoming against a hard stop on the exterior of the tower 14 or bottoming against the upper edges of the lower section walls, such as the side walls 64. In another example, a plurality of aligned holes can be provided in each of the lower and upper sections 52 and 54. A fastener can be utilized to secure the upper and lower sections to one another at any one of selected pair of the aligned holes, if desired.

In this example, there is no access opening in a top cover 82 on the brewer assembly 10. The cover 82 is to be removed in order to adjust the height of the brewer height. However, it is possible to provide an optional access opening 80 (see FIG. 9) through a top cover 82 on the head 16 in order to access the hex head 68 of the shaft 60. Such an access opening 80 can be left uncovered or could have a cap to close off the opening when not being used. As will be evident to those having ordinary skill in the art, the position or location of the threaded shaft 60 relative to the tower 14 and, as in the present example, within the interior of the tower, can vary. In this example, the threaded shaft is spaced closest to a front wall 84 of the lower section 52. Alternatively, the threaded shaft 60 could be placed relatively close to either one of the side walls 64 or a back wall 86, or could be placed near a center of the tower 14. Additionally, the turnkey or tool 72 and the hex head 68 on the shaft 60 can be replaced by other engagement mechanisms that would allow a user to rotate the shaft 60 as needed to raise or lower the height of the tower. In another example, it is possible that the threaded shaft 60 be inverted and the hex head 68 or other engagement mechanism be exposed or accessible through the bottom side 72 of the base 12 in order to adjust the height of the brewing machine 10 from the base 12.

A number of structures and/or components can be utilized to retain alignment between the tower sections 52 and 54 while raising or lowering the height. In addition, these structures and/or components can assist in reducing sliding friction between the upper and lower sections while adjusting the tower height. With reference again to FIG. 3, one or more guide rods 90 can be employed within or outside of the tower 14 and/or as a part of the height adjust mechanism 50. In this example, the mechanism 50 employs a pair of the guide rods 90 spaced on opposite sides of the male threaded shaft 60. These guide rods 90 also interconnect the upper and lower sections of the tower.

In this example, each of the guide rods is affixed to and depends downward from a bottom of the upper plate 66. Each of the rods 90 is a circular cylinder that extends through an opening or hole correspondingly located through the fixed lower plate 62. Also in this example, a rod bearing 92 is positioned on the fixed plate 62 and aligned with each one of the guide rods 90. The rod bearings 92 in the disclosed example are affixed to an underside of the lower plate 62 but alternatively could be positioned on the upper side of the lower plate or bisecting the plane of the plate. The rod bearings 92 can be of sufficient length and construction to retain precise vertical alignment and travel of the upper plate 66 and the guide rods 90. The guide rods 90 can also retain precise relative positioning of the upper section 54 to the lower section 52 of the tower 14 as well as vertical alignment of the shaft 60.

With reference to FIGS. 3 and 5, one can see that the guide rods 90 in this example also vertically slide in concert with the male threaded shaft 60 and the upper section 54 of the tower 14 as its height is adjusted. As with the threaded shaft 60, the location of the guide rods 90 can vary from the disclosed location adjacent the front wall 84 of the lower section 52. Instead, the guide rods 90 can be positioned adjacent either one of the sidewalls 64, the back wall 86, or be centered within the tower 14. It is also possible that one or more of the guide rods 90 be positioned spaced from the threaded shaft 60 instead of being positioned adjacent to shaft. The rods 90 and the shaft 60 can be positioned at different locations relative to the tower interior or exterior within the scope and spirit of the present invention. It is also possible that the guide rods slide through rod bearings connected to structures that are not associated with the female threaded nut or element 65 or, as in this example, either one of the plates that interact with the shaft.

Figure 7:
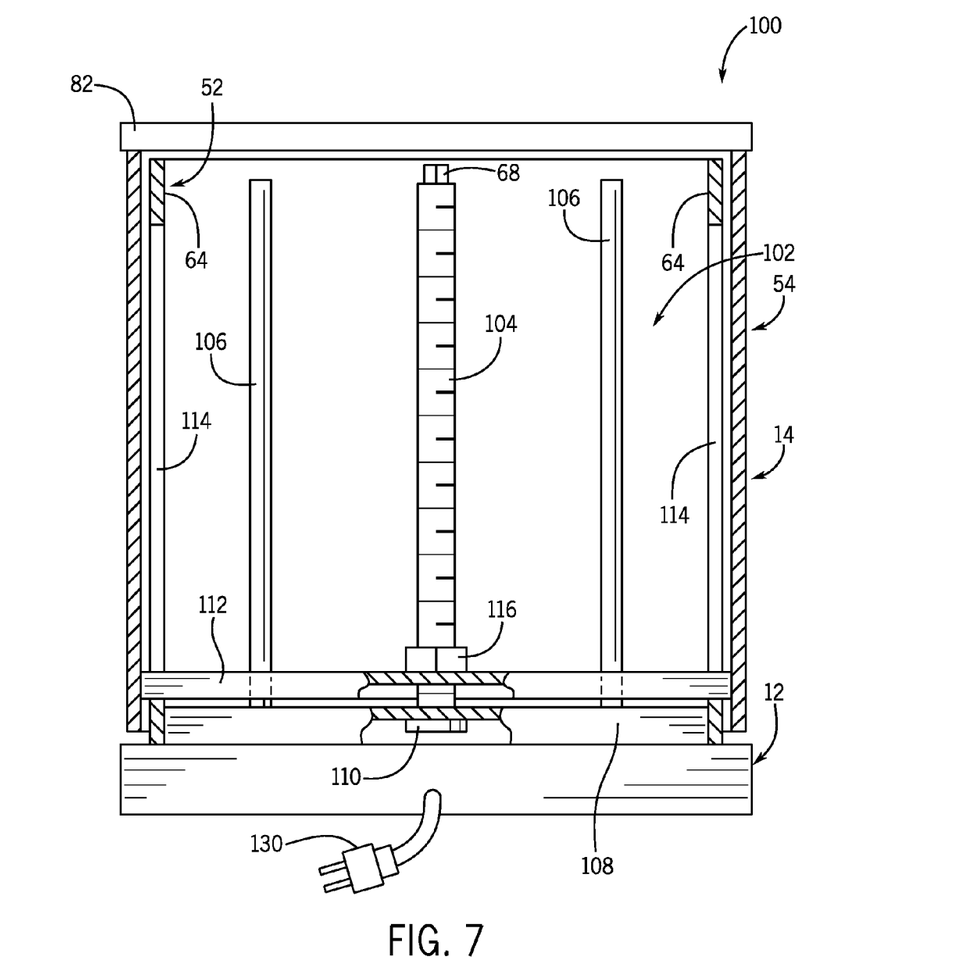
FIG. 7 shows a partial cut-away and rear view of another example of a beverage brewing machine constructed in accordance with the teachings of the present invention, and shown in a minimum adjusted height configuration.
Figure 8:
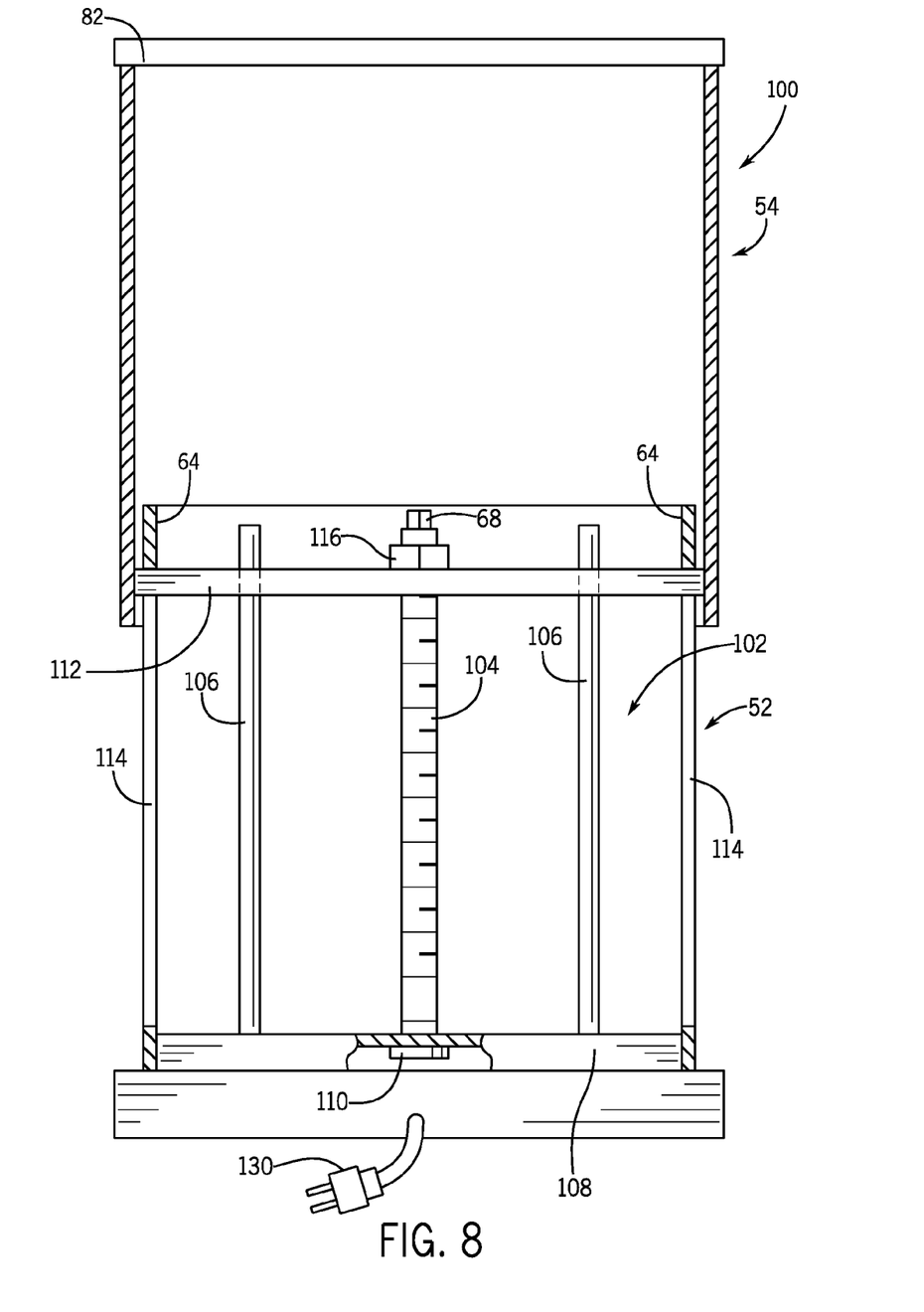
FIG. 8 shows the beverage brewer in FIG. 7 but in a maximum adjusted height configuration.

FIGS. 7 and 8 show another example of a brewing machine 100 constructed in accordance with the teachings of the present invention. In this example, like reference numerals refer to the same components in the earlier example. New reference numbers refer to new or different elements in comparison to those components in the earlier example. As noted above, the height adjust mechanism can vary from the first example described above. In this example, a height adjust mechanism 102 is disclosed that has a male threaded shaft 104 and a pair of flanking guide rods 106. The rods 106 are fixed in a vertical position along with the lower section 52 of the tower 14.

The mechanism 102 in this example has a lower plate 108 they can be affixed to either the base 12 or the lower section 52 of the tower 14. The lower plate 108 in this example is fixed near the lower end of the sidewalls 64 on the lower section. The threaded shaft 104 has a larger diameter head or washer 110 affixed at its bottom and has the same hex head 68 at the upper end. The washer or head 110 retains the shaft 104 in a stationary vertical position along with the fixed lower plate 108. The shaft 104 is again free to rotate relative to the lower plate. An upper plate 112 is affixed to the interior of the sidewalls 79 on the upper section 54 of the tower 14. In this example, the upper plate 112 is positioned near the bottom end of the upper section 54. Slots or tracks 114 extend vertically along and through the sidewalls 64 on the lower section 52 in this example. The lower plate 112 has a portion that protrudes through one of the slots or tracks 114 at each end of the plate.

The shaft 104 extends through an opening or hole in the lower plate 108 and the upper plate 112. A female threaded nut or element 116 is affixed to a top side of the upper plate 112 and aligned with the hole such that the shaft 104 is threaded through the nut. An elongate version (not shown) of the turnkey or tool 72 can be utilized to access and rotate the shaft 104 via the hex head 68. By rotating the shaft, the upper section 54 and the upper plate 112 will travel upward along the shaft 104 as depicted in FIG. 8. As shown therein, it is clear that, in this embodiment, an elongate version of the tool 72 would be needed to reach the hex head 68 through the height of the upper section 54 of the tower 14 because the shaft is vertically stationary. Also as shown, the upper plate 112 travels along the slots or tracks 114 during adjustment. The slots or tracks 114 can be left open or can include some type of a wiper or barrier that allows the upper plates to travel therealong and yet keep the tracks or slots relatively closed to prevent contamination of the internal components of the brewer assembly 10.

In this example, the travel limit of the upper section 54 relative to the lower section 52 can be defined by the ends of the slots or tracks 114. FIG. 7 depicts a minimum height configuration for the brewer assembly 100 in this example and FIG. 8 depicts a maximum height configuration for the assembly. As with the prior embodiment, the configuration, construction, and location of the various guide rods 106, shaft 104, and plates 108 and 112, can vary from that depicted in the figures. In one alternate example, the hex head 68 or other engagement mechanism can be repositioned at the lower end of the shaft 104, either on or near the washer or head 110 and can be accessible through one of the adjacent walls of the lower section 52. This might require a different type of tool. However, the height adjustment function would be essentially the same as each of the examples of the disclosed assemblies 10 and 100.

Figure 9:
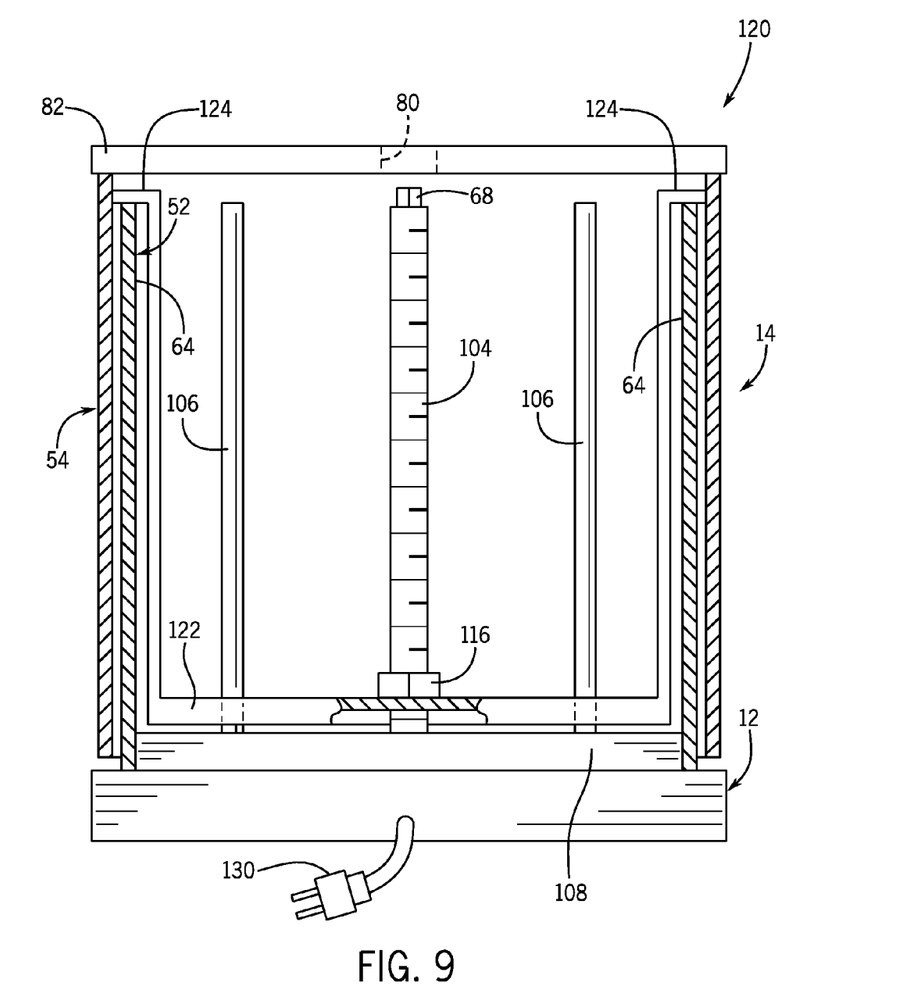
FIG. 9 shows a partial cut-away and rear view of another example of a beverage brewer constructed in accordance with the teachings of the present invention, and shown in a lower most height adjusted configuration.

FIG. 9 illustrates yet another example of a brewing machine 120 constructed in accordance with the teachings of the present invention. In this example, the previously described upper plate 112 is replaced by a U-shaped bracket 122. Upper ends 124 of the bracket 122 are connected to the sidewalls 79 near the top end of the upper section 54. This configuration can eliminate the need for the slots or tracks 114 of the prior example, while still achieving an essentially identical height adjust function as described with reference to the brewer assembly 100.

As noted above, the disclosed brewing machines 10, 100, and 120 can vary in size, configuration, construction, and intended use. The brewing machines can be for in-home, occasional use. In one such example, the brewing machine can include a fill-opening where a user can manually fill the reservoir or tank 32 with water or other suitable liquid either from a faucet or another vessel. In another example, the brewing machine can be a commercial type brewer for high-volume or continuous use. In such an example, the brewer can include a water inlet 126 for connection to a continuous water source as is known in the art. Virtually all of these types of beverage brewing machines operate via electricity. Many if not all include an electric wire or cable and a standard two or three prong plug 130 for connection to a standard power source.

In one alternate example, a small motor (not shown) can be coupled, if desired, to the shaft to adjust the height of the brewing machine instead of requiring manual rotation. However, lack of such a motor will allow for a less expensive and more reliable product while still providing a brewing machine that is compatible with a wide range of vessel and container heights. In still another alternate example, the female threaded nut or element can be configured to rotate while the male threaded shaft is rotationally fixed. Only relative rotational movement between the two components is necessary to achieve height adjustment as disclosed herein.

Although certain coffee brewers and height adjustment mechanisms and components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A beverage brewing machine comprising:
   a base configured to rest on a surface;
   an upward facing vessel support;
   a tower coupled to and extending up from the base, the tower having a stationary lower section and an upper section vertically height adjustable relative to the lower section;
   a head coupled to the upper section of the tower, the head having a cantilevered section extending forward from the tower and spaced above the vessel support; and
   a height adjust mechanism including a vertically oriented male threaded shaft interconnecting the upper and lower sections of the tower, a female threaded element carried on a part of the tower, and a pair of vertically oriented guide rods interconnecting the upper and lower sections and positioned adjacent and flanking the male threaded shaft,
   wherein relative rotation between the male threaded shaft and the female threaded element selectively raises and lowers the vertical position of the upper section and head relative to the lower section and base.

2. A beverage brewing machine according to claim 1, wherein the male threaded shaft rises and falls vertically in concert with the upper section as the height of the tower is adjusted.

3. A beverage brewing machine according to claim 1, wherein the male threaded shaft remains vertically fixed while the upper section moves as the height of the tower is adjusted.

4. A beverage brewing machine according to claim 1, wherein the male threaded shaft rotates and the female threaded element remains rotationally fixed as the height of the tower is adjusted.

5. A beverage brewing machine according to claim 1, wherein the female threaded element is a nut affixed to a portion of one of the upper or lower sections of the tower.

6. A beverage brewing machine according to claim 5, wherein the nut is affixed to a plate in turn affixed within an interior of the tower to one of the upper section or the lower section.

7. A beverage brewing machine according to claim 1, wherein the height adjust mechanism further comprises a lower fixed plate connected to the lower section or the base.

8. A beverage brewing machine according to claim 7, wherein the female threaded element is affixed to the lower fixed plate and the lower plate is connected near a top end of the lower section, and wherein the male threaded shaft is connected to the upper section for vertical movement therewith.

9. A beverage brewing machine according to claim 7, wherein the female threaded element is affixed to an upper plate connected near a bottom end of the upper section and movable therewith, and wherein the male threaded shaft is connected to the lower section or the base.

10. A beverage brewing machine according to claim 1, wherein the height adjust mechanism is disposed within an interior of the tower.

11. A beverage brewing machine according to claim 1, wherein the vessel support is provided on an upward facing surface of the base beneath the cantilevered section of the head.

12. A beverage brewing machine according to claim 1, wherein the lower section of the tower is affixed to the base.

13. A beverage brewing machine, comprising:
    a base configured to rest on a surface;
    an upward facing vessel support;
    a tower coupled to and extending up from the base, the tower having a stationary lower section and an upper section vertically height adjustable relative to the lower section;
    a head coupled to the upper section of the tower, the head having a cantilevered section extending forward from the tower and spaced above the vessel support; and
    a height adjust mechanism including
      i) a vertically oriented male threaded shaft interconnecting the upper and lower sections of the tower and connected to the upper section for vertical movement therewith,
      ii) a lower fixed plate connected near a top end of the lower section, and
      iii) a female threaded element affixed to the lower fixed plate,
    wherein relative rotation between the male threaded shaft and the female threaded element selectively raises and lowers the vertical position of the upper section and head relative to the lower section and base, and
    wherein the male threaded shaft is affixed to an upper plate vertically aligned with the lower fixed plate and connected near a top end of the upper section.

14. A beverage brewing machine according to claim 12, comprising:
    a base configured to rest on a surface;
    an upward facing vessel support;
    a tower coupled to and extending up from the base, the tower having a stationary lower section and an upper section vertically height adjustable relative to the lower section;
    a head coupled to the upper section of the tower, the head having a cantilevered section extending forward from the tower and spaced above the vessel support; and
    a height adjust mechanism including i) a vertically oriented male threaded shaft interconnecting the upper and lower sections of the tower and connected to the lower section or the base, ii) an upper plate connected near a bottom end of the upper section and movable therewith, and iii) a female threaded element affixed to the upper plate, wherein relative rotation between the male threaded shaft and the female threaded element selectively raises and lowers the vertical position of the upper section and head relative to the lower section and base, and wherein the male threaded shaft is affixed to a lower fixed plate vertically aligned with the upper plate and connected near a bottom end of the lower section.

15. A beverage brewing machine comprising:

a base configured to rest on a surface;

an upward facing vessel support;

a tower coupled to and extending up from the base, the tower having a stationary lower section and an upper section vertically height adjustable relative to the lower section;

a head coupled to the upper section of the tower, the head having a cantilevered section extending forward from the tower and spaced above the vessel support; and a height adjust mechanism including i) a vertically oriented male threaded shaft interconnecting the upper and lower sections of the tower, ii) a female threaded element carried on a part of the tower, iii) a lower plate fixed to the base or the lower section, iv) an upper plate fixed to the upper section for movement therewith, and v) a guide rod passing slidably through one of the lower or upper plates as the height of the tower is adjusted, wherein relative rotation between the male threaded shaft and the female threaded element selectively raises and lowers the vertical position of the upper section and head relative to the lower section and base.

16. A beverage brewing machine according to claim 15, wherein the guide rod is affixed to the lower plate and the male threaded shaft is connected to the lower plate, each being vertically stationary as the height of the tower is adjusted, and wherein the female threaded element is carried on the upper plate.

17. A beverage brewing machine according to claim 15, wherein the guide rod is affixed to the upper plate and the male threaded shaft is connected to the upper plate, each moving vertically in concert with movement of the upper section, and wherein the female threaded element is carried on the lower plate.

18. A beverage brewing machine according to claim 15, further comprising a pair of the guide rods positioned adjacent and flanking the male threaded shaft.

* * * * *

UNITED STATES PATENT AND TRADEMARK OFFICE
CERTIFICATE OF CORRECTION

| | | |
|---|---|---|
| PATENT NO. | : 8,397,626 B2 | Page 1 of 1 |
| APPLICATION NO. | : 12/697041 | |
| DATED | : March 19, 2013 | |
| INVENTOR(S) | : Bernard Winkler | |

It is certified that error appears in the above-identified patent and that said Letters Patent is hereby corrected as shown below:

In the claims:
Column 10
claim 14, line 56, please delete "according to claim 12".

Signed and Sealed this
Twentieth Day of October, 2015

Michelle K. Lee
*Director of the United States Patent and Trademark Office*